(12) United States Patent
Koo et al.

(10) Patent No.: US 12,172,704 B2
(45) Date of Patent: Dec. 24, 2024

(54) SERVING ROBOT APPARATUS

(71) Applicant: SAMSUNG ELECTRONICS CO., LTD., Suwon-si (KR)

(72) Inventors: Donghan Koo, Suwon-si (KR); Sanghyun Kang, Suwon-si (KR); Hyunsuk Kwak, Suwon-si (KR); Minhee Lee, Suwon-si (KR); Jaemyung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 17/708,518

(22) Filed: Mar. 30, 2022

(65) Prior Publication Data
US 2022/0227432 A1 Jul. 21, 2022

Related U.S. Application Data

(63) Continuation of application No. PCT/KR2022/000739, filed on Jan. 14, 2022.

(30) Foreign Application Priority Data

Jan. 15, 2021 (KR) .................. 10-2021-0006310
Jan. 6, 2022 (KR) .................. 10-2022-0002275

(51) Int. Cl.
B62D 33/02 (2006.01)
G06F 3/01 (2006.01)
G09F 21/00 (2006.01)

(52) U.S. Cl.
CPC ............. B62D 33/02 (2013.01); G09F 21/00 (2013.01); G06F 3/013 (2013.01)

(58) Field of Classification Search
CPC .......... B62D 33/02; G09F 21/00; G06F 3/013
(Continued)

(56) References Cited

U.S. PATENT DOCUMENTS 8,356,704 B2 * 1/2013 Flessas ................... G06F 3/011
                                                           198/321
9,535,421 B1   1/2017 Canoso et al.
(Continued)

FOREIGN PATENT DOCUMENTS

CN    109531627 A    3/2019
CN    208697447 U    4/2019
(Continued)

OTHER PUBLICATIONS

International Search Report dated May 3, 2022 issued by the International Searching Authority in counterpart International Application No. PCT/KR2022/000739 (PCT/ISA/210).
(Continued)

Primary Examiner — Atul Trivedi
(74) Attorney, Agent, or Firm — Sughrue Mion, PLLC

(57) ABSTRACT

A serving robot apparatus is disclosed. The serving robot apparatus includes a main body; a shelf horizontally supported by the main body; a first driving device configured to move the main body; a display comprising a front surface to display an image and a rear surface disposed to face a side surface of the main body; a link member comprising one end connected to the main body and other end connected to a rear surface of the display; and a second driving device configured to move the link member so that the display moves along the side surface of the main body.

20 Claims, 9 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 9,749,535 | B1* | 8/2017 | Hatao | H04N 13/296 |
| 10,759,045 | B2* | 9/2020 | Yang | B25J 11/008 |
| 11,185,992 | B2 | 11/2021 | Ko | |
| 2009/0192519 | A1* | 7/2009 | Omori | A61B 34/37 |
| | | | | 606/130 |
| 2010/0140046 | A1* | 6/2010 | Flessas | B25J 11/003 |
| | | | | 198/321 |
| 2010/0180709 | A1* | 7/2010 | Choi | B25J 9/06 |
| | | | | 74/490.05 |
| 2010/0191373 | A1* | 7/2010 | Kim | G06N 3/008 |
| | | | | 74/567 |
| 2016/0065920 | A1* | 3/2016 | Flessas | G09F 9/3026 |
| | | | | 348/383 |
| 2016/0250754 | A1* | 9/2016 | Chang | F16M 11/18 |
| | | | | 700/259 |
| 2018/0078034 | A1* | 3/2018 | Savall | A47B 21/03 |
| 2019/0238806 | A1* | 8/2019 | Flessas | G03B 21/56 |
| 2019/0327394 | A1* | 10/2019 | Ramirez Luna | H04N 23/51 |
| 2019/0394431 | A1* | 12/2019 | Flessas | G03B 17/561 |
| 2020/0009740 | A1* | 1/2020 | Youn | B25J 11/0005 |
| 2020/0138534 | A1* | 5/2020 | Garcia Kilroy | A61B 34/20 |
| 2020/0262084 | A1 | 8/2020 | Ko | |
| 2020/0290208 | A1 | 9/2020 | Ha et al. | |
| 2020/0341480 | A1 | 10/2020 | Jung | |
| 2021/0339399 | A1* | 11/2021 | Schluntz | G05D 1/0088 |
| 2022/0104910 | A1* | 4/2022 | Shelton, IV | A61B 90/361 |
| 2022/0108788 | A1* | 4/2022 | Shelton, IV | G16H 40/67 |
| 2022/0227432 | A1* | 7/2022 | Koo | G06F 1/1626 |

FOREIGN PATENT DOCUMENTS

| | | | | |
|---|---|---|---|---|
| CN | 214323372 U | * | 10/2021 | ............ B25J 11/008 |
| JP | 2001-300876 A | | 10/2001 | |
| KR | 20-0441761 Y1 | | 9/2008 | |
| KR | 10-2010-0110143 A | | 10/2010 | |
| KR | 10-1083700 B1 | | 11/2011 | |
| KR | 10-1243262 B1 | | 3/2013 | |
| KR | 10-1592118 B1 | | 2/2016 | |
| KR | 20160135277 A | * | 11/2016 | ............ A61B 90/37 |
| KR | 10-2070213 B1 | | 1/2020 | |
| KR | 10-2020-0101056 A | | 8/2020 | |
| KR | 10-2020-0133174 A | | 11/2020 | |
| KR | 20220002263 U | * | 9/2022 | ............ B25J 9/1664 |
| WO | WO-2016032888 A1 | * | 3/2016 | ............ B25J 18/04 |
| WO | WO-2019210322 A1 | * | 10/2019 | ............ A61B 34/30 |
| WO | WO-2020092170 A1 | * | 5/2020 | ............ A61B 34/20 |

OTHER PUBLICATIONS

International Written Opinion dated May 3, 2022 issued by the International Searching Authority in counterpart International Application No. PCT/KR2022/000739 (PCT/ISA/237).
Communication issued Feb. 29, 2024 by the European Patent Office in European Patent Application No. 22739770.0.

* cited by examiner

SERVING ROBOT APPARATUS

CROSS-REFERENCE TO RELATED APPLICATIONS

This application is a bypass continuation of International Application No. PCT/KR2022/000739, filed on Jan. 14, 2022, which claims priority to Korean Patent Application No. 10-2021-0006310, filed on Jan. 15, 2021, in the Korean Intellectual Property Office, and Korean Patent Application No. 10-2022-0002275, filed on Jan. 6, 2022, in the Korean Intellectual Property Office, the disclosures of which are herein incorporated by reference in their entirety.

BACKGROUND

1. Field

The disclosure relates to a serving robot apparatus, and more particularly, to a serving robot apparatus having a display which may move along a side surface of a main body so that the display faces a serving position for easy interaction with a customer.

2. Description of Related Art

According to the development of the robot technology, a robot that carries an object to be served (e.g., food, food on a plate or dish, etc.) to a designated location in a restaurant or the like has been developed. However, when tables in a restaurant are disposed with narrow spacing, i.e., with a narrow aisle, with limited space to a wall, etc., a robot moving between tables or next to a table may be limited in movement such as a rotational movement so as not to collide with a table.

In addition, there is a problem in that, in order to allow a robot arriving at a target table to interact with a customer through the display that is fixed to the robot, the entire robot must rotate within a narrow passage or space.

SUMMARY

In accordance with an aspect of the disclosure, there is provided a serving robot apparatus which includes a display that moves along a side surface of a main body so as to be directed to a serving position to easily interact with a customer.

A serving robot apparatus according to an embodiment includes a main body; a shelf horizontally supported by the main body; a first driving device configured to move the main body; a display including a front surface to display an image and a rear surface disposed to face a side surface of the main body; a link member including one end connected to the main body and another end connected to a rear surface of the display; and a second driving device configured to move or pivot the link member so that the display moves along the side surface of the main body.

The serving robot apparatus may further include a guide rail disposed along the side surface of the main body, and the link member may include a block member connected to the rear surface of the display and movably provided along the guide rail.

The guide rail may have a U-shape.

The second driving device may include a rotation motor fixed to the main body, and the link member may include a first link including one end connected to the rotation motor and a second link including one end slidably connected to the first link and another end connected to the block member.

An upper surface of the first link may be disposed to face a lower surface of the second link.

The main body may include a first sidewall and a second sidewall disposed to face with each other and supporting the shelf horizontally; a first body supporting an upper end of the first sidewall and the second sidewall; and a second body supporting a lower end of the first sidewall and the second sidewall.

A rear surface of the display may be disposed to face a side surface of the first body.

The main body may include a slit formed along the side surface of the main body, and the serving robot apparatus may further include a cover member configured to close the slit, and be slidably supported by the main body, and the block member may be disposed through the cover member.

The main body may include a guide slot into which the upper end and the lower end of the cover member are inserted.

The serving robot apparatus may further include a third driving device configured to tilt the display in a vertical direction, and the third driving device may include a tilting motor fixed to the block member; a first tilting link including one end connected to the tilting motor and another end connected to a rear surface of the display and moving forward or backward by the tilting motor; and a second tilting link including one end connected to the block member and another end to which a rear surface of the display is tiltably connected.

The first tilting link may be disposed below the second tilting link.

The serving robot apparatus may further include a processor configured to control the tilting motor so that preload is applied to the first tilting link based on the main body moving by the first driving device.

The display may include a stopper protrusion formed in a rear surface and disposed between the first tilting link and the second tilting link, and the serving robot apparatus may further include an elastic member disposed on a lower surface of the first tilting link, wherein the stopper protrusion is operably in contact with the elastic member.

The serving robot apparatus may further include a cable member disposed along the link member and electrically connected to the display.

The serving robot apparatus may further include a processor configured to, based on receiving a serving command including a serving position by a user, control the first driving device so that the main body moves within a preset distance range from the serving position, and control the second driving device so that a front surface of the display faces to the serving position.

In an embodiment, there is a robot for transporting an object, the robot including: a display including a front surface and a rear surface; a main body; a shelf operable to support the object to be transported; a variable-length linkage arm connected a motor in the main body; a mount disposed at a distal end of the variable-length linkage arm and pivotably coupled to the rear surface of the display; a guide rail configured to slidably support the mount; and a processor configured to: based on receiving an instruction, control the robot to move to a predetermined position, and control the motor connected to the variable-length linkage arm, to move the display about the main body so that the front surface of the display faces a predetermined direction at the predetermined position.

BRIEF DESCRIPTION OF THE DRAWINGS

The above and other aspects, and features of certain embodiments of the disclosure will be more apparent from the following description taken in conjunction with the accompanying drawings, in which.

DETAILED DESCRIPTION

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

Since the components required for the description of each embodiment of the disclosure have been described herein, the embodiment is not limited thereto. Thus, some components may be modified or omitted and other components may be added. In addition, the components may be distributed and arranged in different independent devices.

Furthermore, although the embodiments of the disclosure will be described in detail with reference to the accompanying drawings and the contents set forth in the accompanying drawings, the disclosure is not limited to the embodiments.

Hereinbelow, the disclosure will be described in greater detail with reference to the attached drawings.

Figure 1:
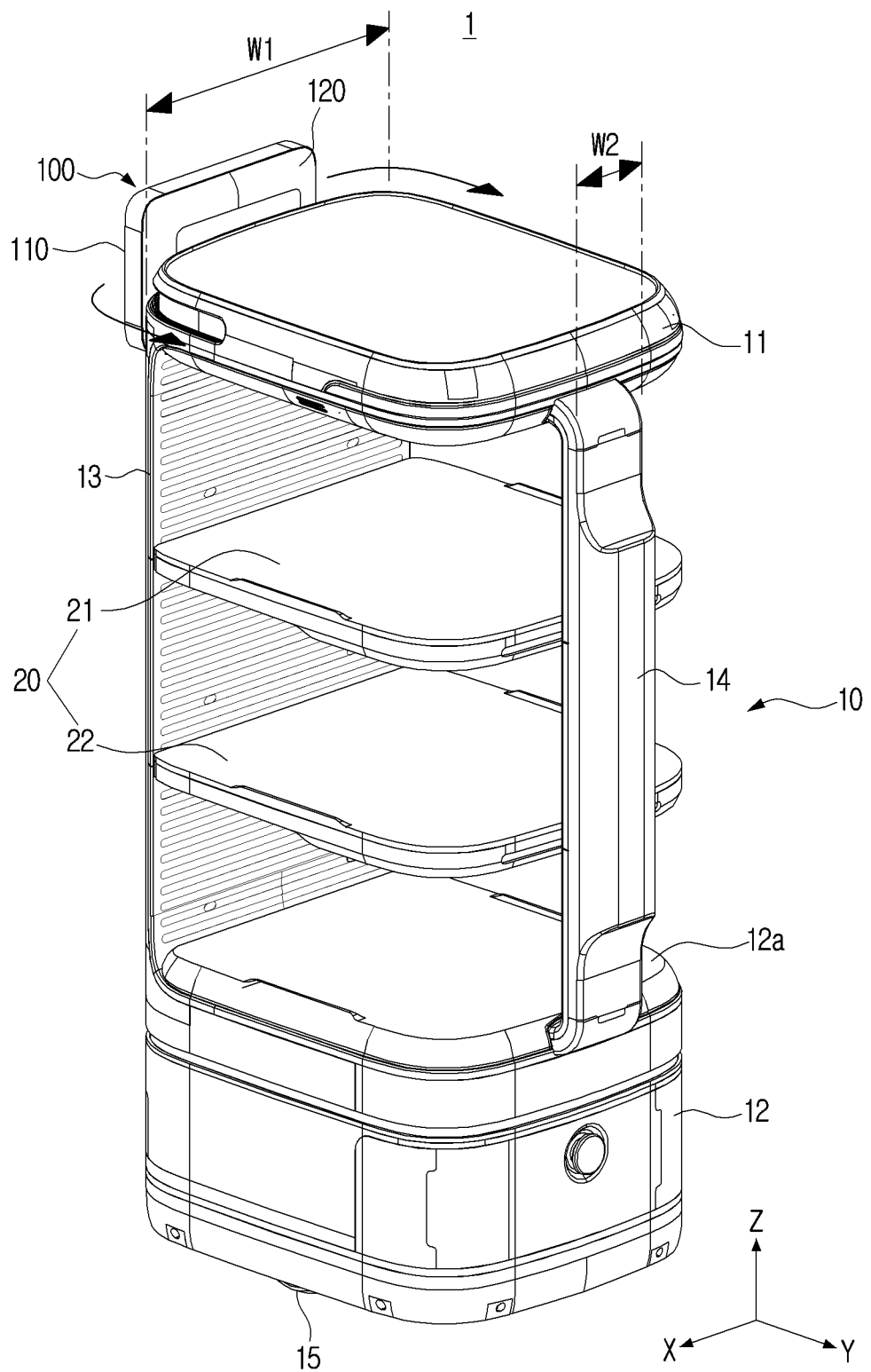
FIG. 1 is a perspective view of a serving robot apparatus according to an embodiment of the disclosure.
Figure 2:
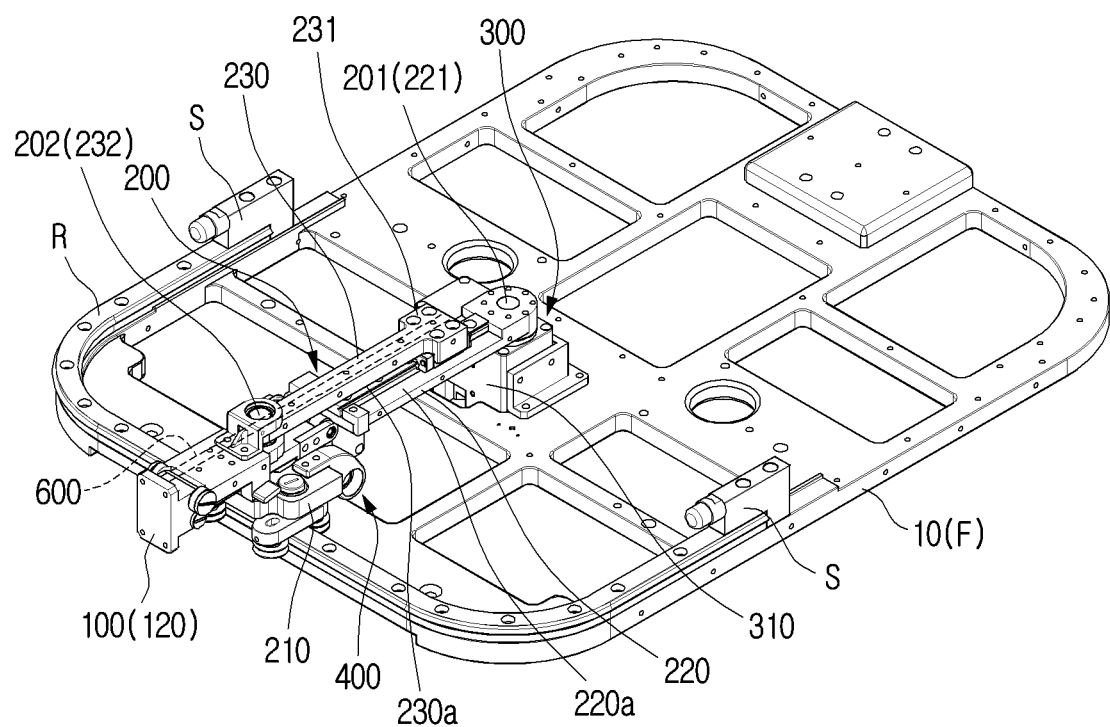
FIGS. 2 and 3 are diagrams illustrating a process of moving a display along a side surface of a main body.
Figure 3:
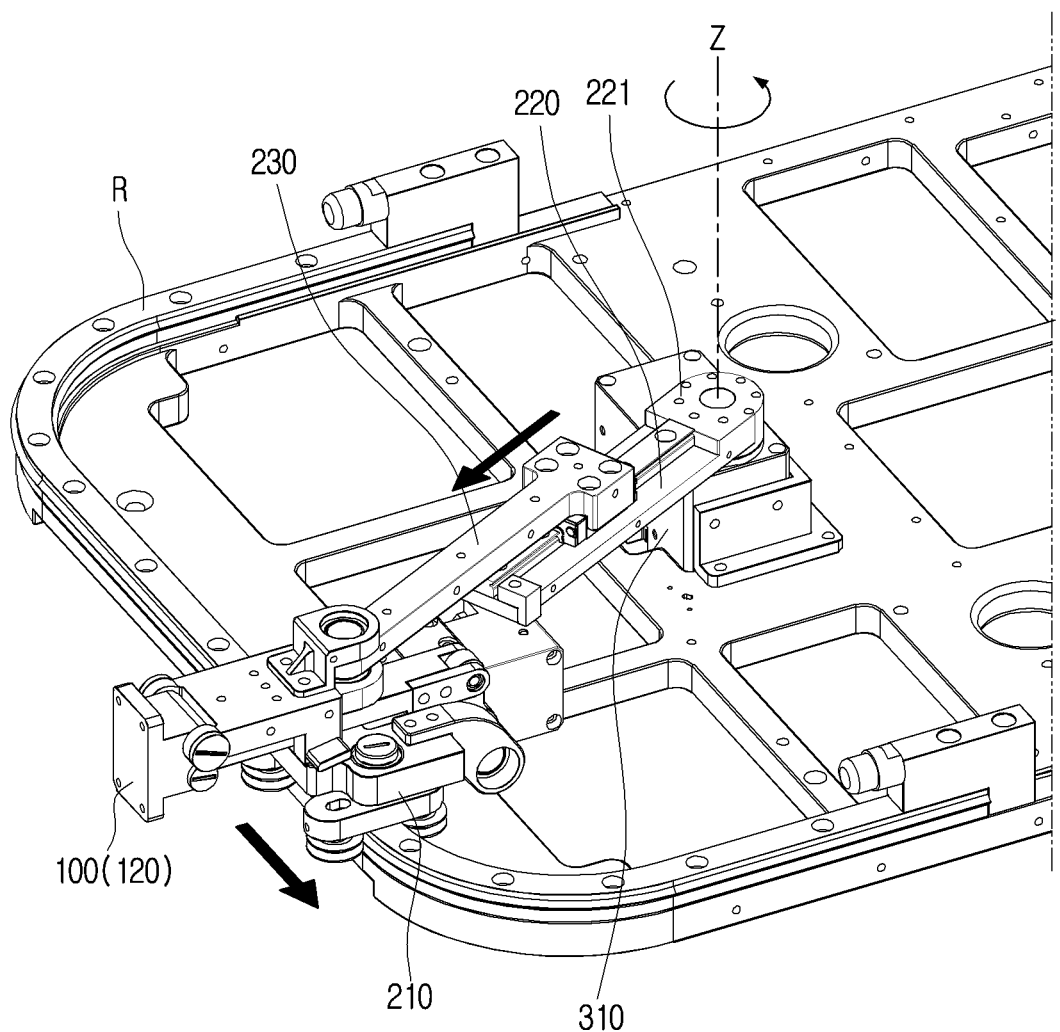

FIG. 1 is a perspective view of a serving robot apparatus 1 according to an embodiment of the disclosure; FIGS. 2 and 3 are diagrams illustrating a process of moving a display along a side surface of a main body. Although the following describes the operation of the serving robot apparatus, the present disclosure also includes other robots or other types of robot, including delivery robots or any robots which transport any object from one location to another.

Referring to FIGS. 1 to 3, a serving robot apparatus 1 according to an embodiment of the disclosure may include a main body 10, a shelf 20, a first driving device 30, a display 100, a link member 200, and a second driving device 300. In an embodiment, the shelf 20 may be a tray.

The main body 10 may include a first body 11, a second body 12, a first sidewall 13, and a second sidewall 14.

The first body 11 and the second body 12 may have a substantially rectangular parallelepiped shape, but it is not limited thereto. The first body 11 may be disposed on an upper side of the second body 12. The first body 11 and the second body 12 may accommodate therein a plurality of electronic components for the operation of the serving robot apparatus 1.

The first sidewall 13 and the second sidewall 14 may be vertically disposed and may connect the first body 11 and the second body 12. The first body 11 may support the upper ends of the first and second sidewalls 13 and 14, and the second body 12 may support the lower ends of the first and second sidewalls 13 and 14.

The first sidewall 13 and the second sidewall 14 may be disposed to face each other and may have the same height. The first and the second side walls 13, 14 may support a shelf 20 disposed therebetween. The second sidewall 14 may have a width smaller than the first sidewall 13. That is, the width W2 of the second sidewall 14 may be smaller than the width W1 of the first sidewall 13.

The first sidewall 13 may have a sufficiently long width W1 so that the shelf 20 may be stably supported, and the second sidewall 14 may have a sufficiently small width W2 to allow the shelf 20 to be exposed to the outside and be unobstructed as much as possible so that the object to be served can be easily placed and removed from the shelf 20.

Accordingly, interference between the object to be served and first and second sidewall 13, 14 is minimized, and a user may place the object to be served on an upper surface of the shelf 20 or may easily pick up the object to be served that has been placed on the shelf 20. The user may also place the object to be served on an upper surface 12a of the second body 12.

The shelf 20 may be supported by the main body 10 or may be disposed horizontally. The shelf 20 may be disposed between the first and second sidewalls 13, 14 or may have a shape of a plate having an approximate rectangular cross-section. The shelf 20 may be disposed horizontally without being tilted and thus may stably support the object to be served that has been placed on the upper surface.

The shelf 20 may include a first shelf 21 and a second shelf 22. The first and second shelves 21 and 22 may be arranged in parallel with each other. However, the number of the shelves 20 is not limited to two, but three or more of the shelves 20 may be formed.

The first driving device 30 may move the serving robot apparatus 1. The first driving device 30 may rotate the plurality of wheels 15 disposed on the lower surface of the second body 12 to move the serving robot apparatus 1 to a predetermined position. Accordingly, the serving robot apparatus 1 can carry an object to be served to a designated location.

The first driving device 30 may include a motor, a battery, an actuator, a gear, a bearing, or the like, and may be accommodated in the second body 12.

The display 100 may include a front surface 110 for displaying an image and a rear surface 120 disposed to face a side surface of the main body 10. The rear surface 120 of the display 100 may be disposed to face a side surface of the first body 11. The display 100 may be supported by the first body 11. The display 100 may be disposed outside the main body 10.

The display 100 may provide an image including information related to the serving of the object. For example, the display 100 may display a target table to which the serving robot apparatus 1 is to move and information corresponding to the object to be served.

The display 100 may be a touch screen. The user may touch the display 100 to input information about the target table to the serving robot apparatus 1. A customer may touch the display 100 to provide input to the serving robot apparatus 1 indicating that the object to be served has been received.

The serving robot apparatus 1 may further include a sensor (not shown), e.g., a camera, depth camera, etc., for capturing the surrounding environment of the serving robot apparatus 1. The serving robot apparatus 1 may recognize the surrounding environment based on the information collected by the camera, is capable of autonomous driving, may collect information, and may transmit information to the user. The camera may also detect a pose of a customer or the location of certain physical attributes of the customer.

A link member 200 may include one end 201 connected to the main body 10 and another end 202 connected to the rear surface 120 of the display 100.

The second driving device 300 may move the link member 200 so that the display 100 moves about the main body 10. In an exemplary embodiment, the display 100 moves along with the side surface of the main body 10.

As the link member 200 pivots about the one end 201, the display 100 connected to the other end 202 of the link member 200 may move along the side surface of the main body 10. In an exemplary embodiment, the link member 200 may rotate about the one end 201. For example, when the serving robot apparatus 1 receives information from a user or a customer through the display 100 or provides information as an image, only the front surface 110 of the display 100 may move along the side surface of the main body 10 so that the front surface 110 of the display 100 faces the user or the customer, without rotating or turning the main body 10. Accordingly, the serving robot apparatus 1 according to an embodiment of the disclosure may easily interact with a user or a customer while minimizing its movement.

The serving robot apparatus 1 may further include a guide rail R disposed along a side surface of the main body 10. The guide rail may have a U-shape, but is not limited thereto. In an embodiment, the guide rail may have any shape that allows unhindered movement of the display 100 so the rear surface 120 does not contact the side surface of the main body 10. The guide rail R may form a non-circular path through which the block member 210 moves. In an embodiment, the guide rail R may have a closed loop shape, e.g., racetrack-shape, circular shape, oval shape, etc., whereby the link member 200 rotates about the one end 201 to move the block member 210 along such a guide rail, so that the display can be moved around the entire outer periphery of the main body 10.

The guide rail R may be disposed along an edge of the main body 10.

The link member 200 may include a block member 210 connected to the rear surface 120 of the display 100 and provided to be movable along the guide rail R. The lower surface of the block member 210 may be slidably supported on the guide rail R. The block member 210 may have a shape engaged with the guide rail R.

The display 100 may move integrally with the block member 210. Since the guide rail R and the block member 210 are disposed adjacent to the side surface of the main body 10, the display 100 disposed outside the main body 10 may be stably supported. Since the distance between the block member 210 having its lower surface supported by the main body 10, e.g., the guide rail R, and the display 100 is sufficiently short, the moment according to the weight of the display 100 acting on the block member 210 may be sufficiently small.

The second driving device 300 may include a motor 310 fixed to the main body 10. The link member 200 may include the first link 220 and the second link 230.

The first link 220 may include one end 221 connected to the motor 310 and another end that is distal to the one end 221. The one end 221 of the first link 220 may be a rotational center of the first link 220. The first link 220 may pivot, e.g., partially rotate, with respect to a vertical axis (Z) defined by the motor 310. In an embodiment, the first link 220 is a slotted link.

The second link 230 may include one end 231 slidably connected to the first link 220 and another end 232 connected to the block member 210. An upper surface 220a of the first link 220 may be disposed opposite to a lower surface 230a of the second link 230. In an embodiment, the one end 231 includes a pin or a protrusion which fits in a slot of the first link 220.

The length of each of the first link 220 and the second link 230 may fixed, but the second link 230 may get closer or distant from the one end 221 of the first link 220.

Accordingly, since the second link 230 slides relative to the first link 220 and the entire length of the first and second links 220 and 230 varies, the motion of the other end 232 may be non-circular. In other words, the first and the second links 220 and 230 operate to provide the link member 200 with a variable stroke length. Hence, the side surface of the main body 10 may be formed to be non-circular, and the guide rail R may provide a non-circular path so that the block member 210 and the display 100 may be easily moved along the non-circular path.

The display 100 may be movable along the side of the body 10 having various shapes, and the cross-sectional shape of the body 10 may have a rectangular shape without being limited to the circular shape, so that the shelf 20 may carry more objects to be served.

The serving robot apparatus 1 may further include a cable member 600 disposed along the link member 200 and electrically connected to the display 100. The cable member 600 may provide power and an image signal to the display 100. The cable member 600 may be routed via the one end 221 of the first link 220 which is the rotational center of the link member 200.

Accordingly, even if the link member 200 is moved with a variable rotational radius, the length variation of the cable member 600 may be minimized. The slack in the cable member 600 may be minimized, and the cable member 600 may be prevented from being unintentionally twisted or damaged from contact with other components.

Figure 4:
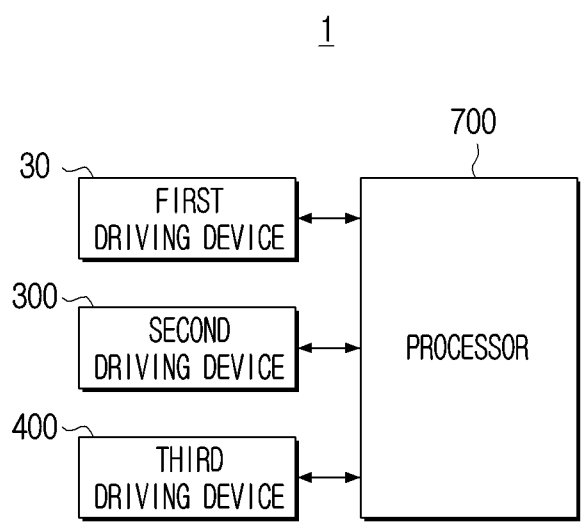
FIG. 4 is a block diagram schematically illustrating a process of controlling a serving robot apparatus according to an embodiment of the disclosure.
Figure 5:
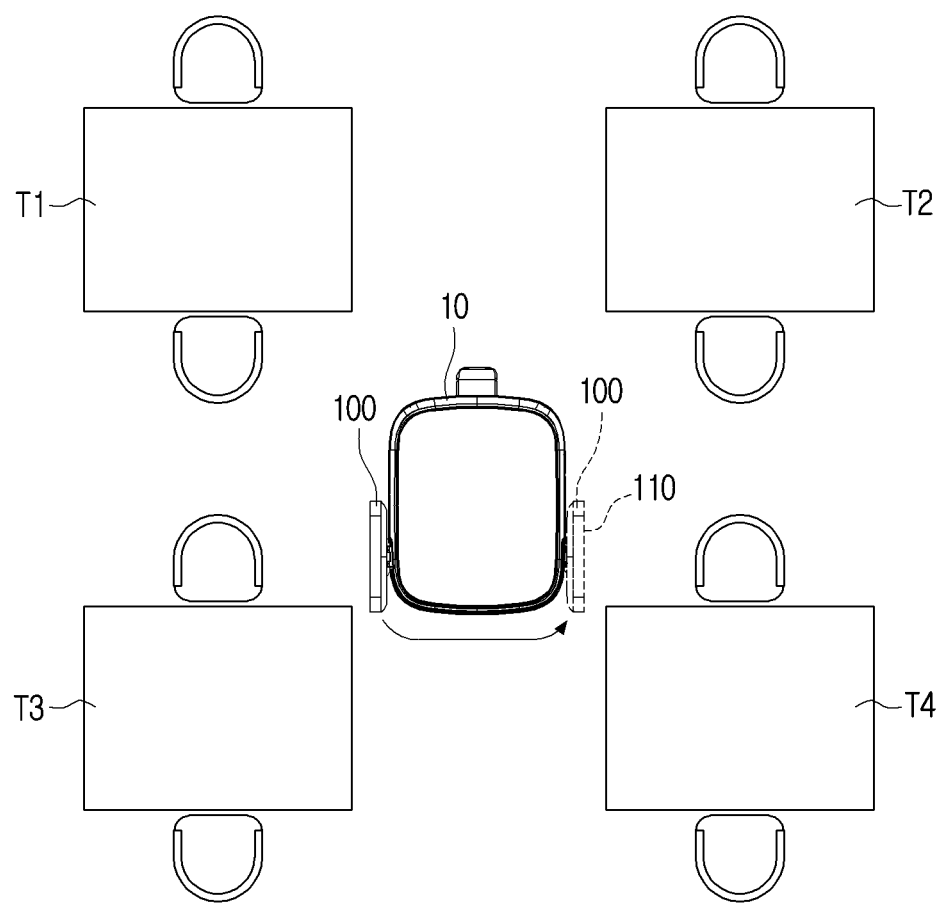
FIG. 5 is a diagram illustrating that the serving robot apparatus performs a serving operation.

FIG. 4 is a block diagram schematically illustrating a process of controlling a serving robot apparatus according to an embodiment of the disclosure; FIG. 5 is a diagram illustrating that the serving robot apparatus performs a serving operation.

Referring to FIGS. 4 and 5, the serving robot apparatus 1 may further include a processor 700.

The processor 700 may, based on receiving from a user, a serving command comprising a serving position, control the first driving device so that the serving robot apparatus 1 moves within a preset distance range from the serving position. The processor 700 may control the second driving device 300 so that a front surface 110 of the display 100 faces the serving position. The serving position may refer to a position of a customer to receive the object to be served.

For example, a plurality of tables (T1, T2, T3, T4) may be arranged in two rows and two columns, and the serving robot apparatus 1 may move between first and third tables (T1, T3) and second and fourth tables (T2, T4). Thereafter, the main body 10 may not move, and only the display 100 may move along the side surface of the main body 10 so that the front surface 100 faces the third table (T3) or the fourth table (T4).

When the serving robot apparatus 1 receives information from a user or a customer through the display 100 or provides the information as an image, the front surface 110 of the display 100 may move along the side surface of the main body 10 so that the front surface 110 of the display 100 faces the user or the customer without the rotation of the main body 10. Accordingly, the serving robot apparatus 1 according to an embodiment of the disclosure may easily interact with a user or a customer.

Figure 6:
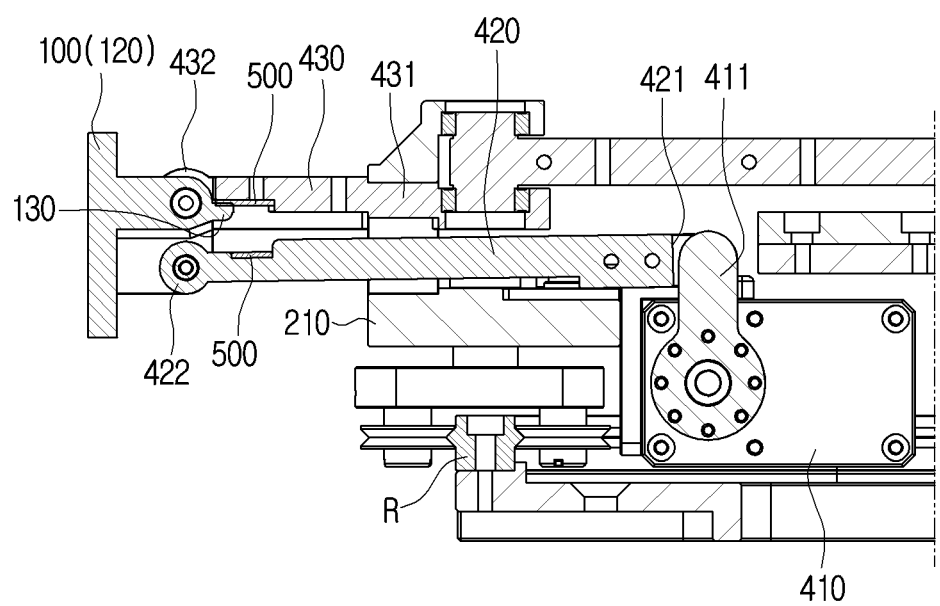
FIGS. 6 and 7 are cross-sectional views illustrating that a display tilts in a vertical direction.
Figure 7:
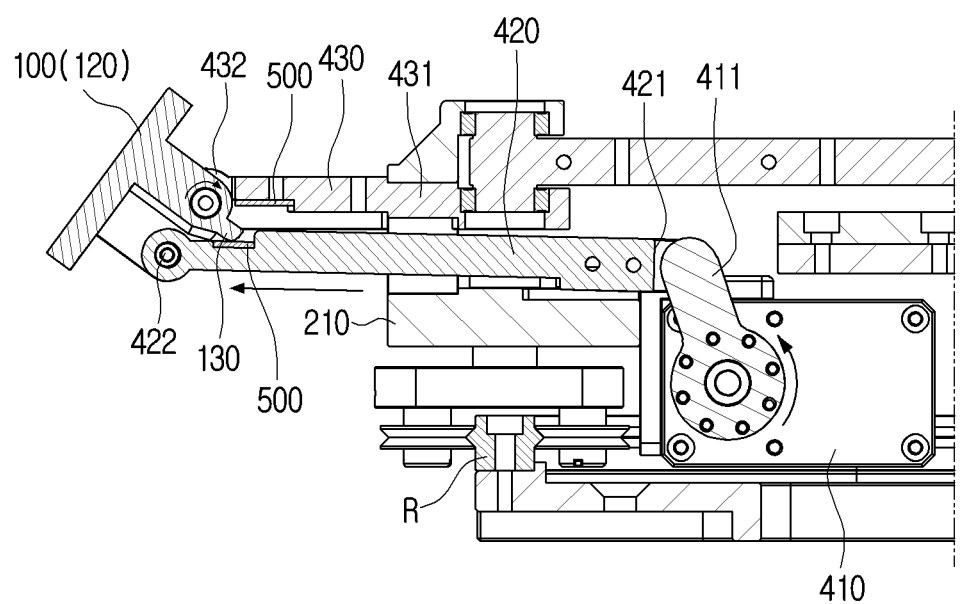

FIGS. 6 and 7 are cross-sectional views illustrating that a display tilts in a vertical direction.

Referring to FIGS. 6 and 7, the serving robot apparatus 1 according to an embodiment may further include a third driving device 400 to tilt the display 100 vertical direction.

The third driving device 400 may include a tilting motor 410, a first tilting link 420, and a second tilting link 430.

The tilting motor 410 may be fixed to the block member 210, may operate based on an input signal, and may integrally move with the block member 210.

The first tilting link 420 may include one end 421 connected to the tilting motor 410 and another end 422 connected to a rear surface 120 of the display 100. The first tilting link 420 may move forward or backward by the tilting motor 410 and may push forward or pull backward the display 100. For example, the tilting link 420 may move the rotation link 411 clockwise, and the first tilting link 420 connected to the rotation link 411 may move forward.

The second tilting link 430 may include one end 431 connected to the block member 210 and another end 432 rotatably connected to the rear surface 120 of the display 100. The second tilting link 430 is integrally moved with the block member 210, and the other end 432 of the second tilting link 430 may define a pitch axis of the display 100. The display 100 may tilt in a vertical direction about the other end 432 of the second tilting link 430.

The first tilting link 420 may be disposed below the second tilting link 430.

For example, when the first tilting link 420 moves forward, the front surface 110 of the display 100 may tilt upward, i.e., face toward the upward direction, and when the first tilting link 420 moves backward, the front surface 110 of the display 100 may tilt downward, i.e., be oriented toward the downward direction.

Accordingly, the display 100 may interact with a user or a customer sitting or standing in various situations. The pose or gaze of the customer or the location of various physical attributes of the customer, e.g., head, eyes, face, etc., may be determined from an image captured by the aforementioned camera. The amount of tilt of the display 100 may be based on the input signal provided to the tilting motor 410. The input signal may be generated based on the determined pose or gaze of the customer or the location of various physical attributes of the customer, so that the display 100 is easily viewed by the customer.

The processor 700 may control the tilting motor 410 so that preload is applied to the first tilting link 420 based on the main body 10 moving by the first driving device 30.

While the serving robot apparatus 1 is moving, the vibration of the first tilting link 420 and the display 100 that may be generated by the backlash of the tilting motor 410 may be minimized by applying a preload.

For example, when the front surface 110 of the display 100 faces forward (outward), as shown in FIG. 6, the tilting motor 410 may generate preload in a clockwise direction to allow the preload to be applied to the first tilting link 420 in a backward direction. When the front surface 110 of the display 100 faces upward, as shown in FIG. 7, the tilting motor 410 may generate a preload in a counterclockwise direction to allow the preload to be applied to the first tilting link 420 in a front (outward) direction. Accordingly, even while the main body 10 moves, vibration of the display 100 may be minimized.

The display 100 may include a stopper protrusion 130. The stopper protrusion 130 may be formed in the rear surface 120 of the display 100 and may be disposed between the first tilting link 420 and the second tilting link 430.

As a stopper protrusion 130 is operable to be in contact with the first tilting link 420 or the second tilting link 430, the display 100 may tilt within a preset angle range in a vertical direction.

The serving robot apparatus 1 may further include an elastic member 500 disposed on a lower surface of the first tilting link 420 and operably in contact with the stopper protrusion 130. The elastic member 500 may be made of elastomer, rubber, rubber-like material, or may be a spring, but a type is not limited thereto.

The elastic member 500 may of two members, and one of the elastic members may be disposed on an upper surface of the first tilting link 420 and the other one may be disposed on a lower surface of the second tilting link 430.

The stopper protrusion 130 does not directly collide with the first and second tilting links 420, 430 but come into contact with the elastic member 500 and thus, damage of parts may be prevented and noise which may occur unintentionally due to collision may be prevented.

Figure 8:
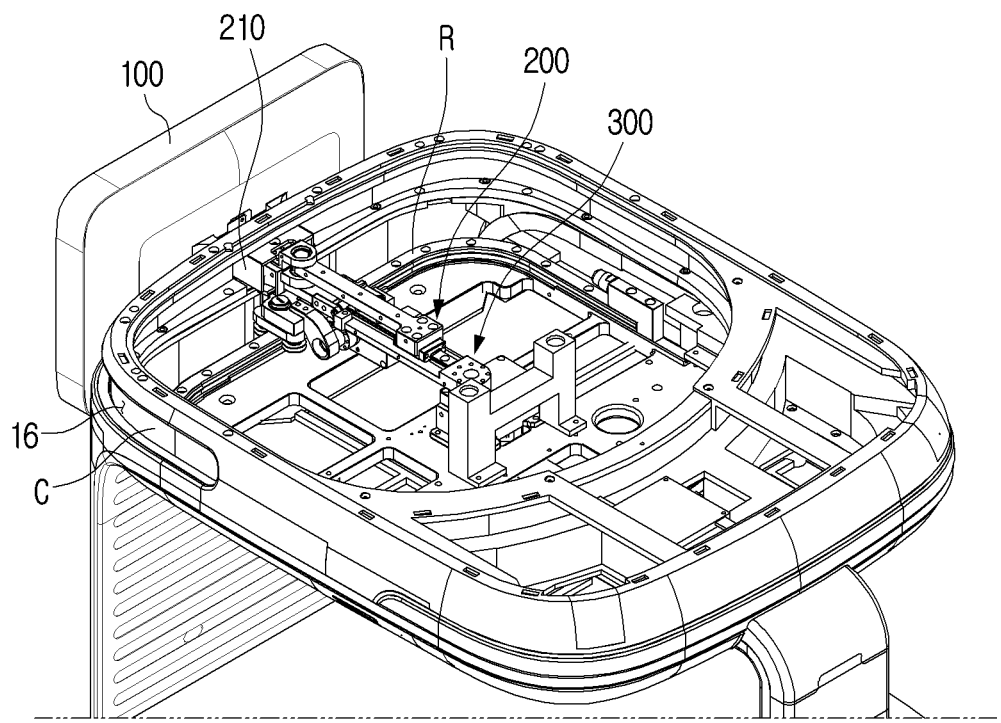
FIGS. 8 and 9 are diagrams illustrating a structure of a cover member closing a slit of a main body.
Figure 9:
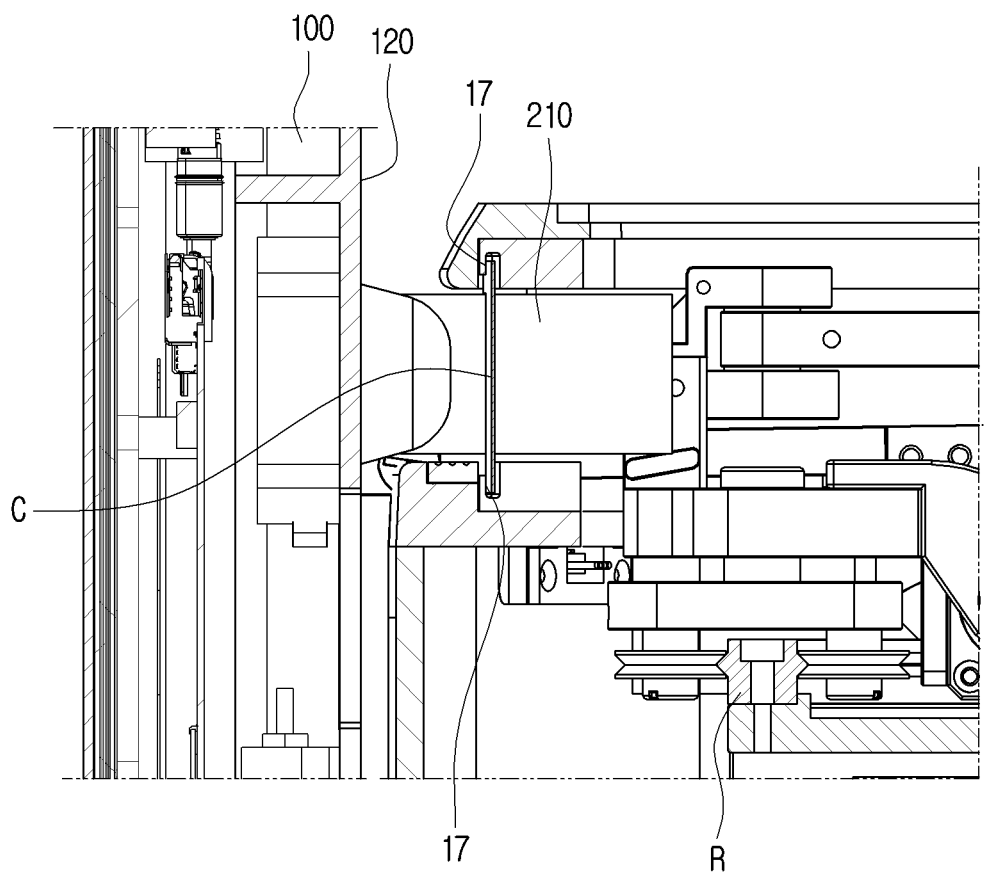

FIGS. 8 and 9 are diagrams illustrating a structure of a cover member closing a slit of a main body.

Referring to FIGS. 8 and 9, the main body 10 may include a slit 16 formed along a side surface of the main body 10. The slit 16 may be disposed along a moving path of the display 100. The main body 10 may accommodate the link member 200 and the second driving device 300 therein, and the slit 16 may connect the inside and the outside of the main body 10, i.e., the slit 16 may provide an opening on the first body 11.

The serving robot apparatus 1 may further include a cover member C. The cover member C may close a slit 16, and may be slidably supported by the main body 10, and the block member 210 may be disposed through the cover member C. The cover member C may be formed of a thin film and may have a ring shape. For example, the cover member C may be formed of a low-rigidity plastic, but the material is not limited thereto.

For example, when the link member 200 pivots, the block member 210 moving along the guide rail R may push the cover member C. Accordingly, the cover member C may slide along the side surface of the main body 10 and may still close the slit 16.

By the cover member C, the link member 200 and the second driving device 300 may not be exposed to the outside, and the serving robot apparatus 1 may have a compact and clean appearance.

The main body 10 may include a guide slot 17 into which the upper end and the lower end of the cover member C are inserted. The guide slot 17 may provide a movement path of the cover member C. The guide slot 17 may have a section corresponding to the slit 16 and the remaining section accommodated in the main body 10. The remaining section of the guide slot 17 may have a sufficiently large rotational radius so that the frictional force between the cover member C and the guide slot 17 may be minimized.

While the present disclosure has been shown and described with reference to exemplary embodiments thereof, it will be understood by those of ordinary skill in the art that various changes in form and details may be made therein without departing from the spirit and scope of the disclosure claimed in the claims.

What is claimed is:

1. A serving robot apparatus comprising:
   a main body;
   a horizontal shelf supported by the main body;
   a first driving device configured to move the main body;
   a display comprising a front surface and a rear surface, the display being configured to display an image at the front surface and the rear surface being disposed to face a side surface of the main body;
   a link member comprising one end connected to the main body and another end connected to the rear surface of the display; and
   a second driving device configured to move the link member so that the display moves along the side surface of the main body.

2. The serving robot apparatus of claim 1, further comprising:
   a guide rail disposed along the side surface of the main body,
   wherein the link member further comprises a block member connected to the rear surface of the display and movably provided along the guide rail.

3. The serving robot apparatus of claim 2, wherein the guide rail comprises a U-shape.

4. The serving robot apparatus of claim 2, wherein the second driving device comprises a motor fixed to the main body,
   wherein the link member further comprises a first link comprising one end connected to the rotation motor and a second link comprising one end slidably connected to the first link and another end connected to the block member.

5. The serving robot apparatus of claim 4, wherein an upper surface of the first link is disposed to face a lower surface of the second link.

6. The serving robot apparatus of claim 2, wherein the main body comprises a slit formed along the side surface of the main body, and
   wherein the serving robot apparatus further comprises a cover member configured to close the slit and be slidably supported by the main body, and
   wherein the block member is disposed through the cover member.

7. The serving robot apparatus of claim 6, wherein the main body further comprises a guide slot into which an upper end of the cover member and a lower end of the cover member are inserted.

8. The serving robot apparatus of claim 2, further comprising:
   a third driving device configured to tilt the display in a vertical direction,
   wherein the third driving device comprises:
     a tilting motor fixed to the block member;
     a first tilting link comprising one end connected to the tilting motor and another end connected to a rear surface of the display and configured to be moved forward or backward by the tilting motor; and
     a second tilting link comprising one end connected to the block member and another end to which a rear surface of the display is pivotably connected.

9. The serving robot apparatus of claim 8, wherein the first tilting link is disposed below the second tilting link.

10. The serving robot apparatus of claim 9, wherein the display further comprises a stopper protrusion formed at the rear surface and disposed between the first tilting link and the second tilting link, and the serving robot apparatus further comprises:
    an elastic member disposed on a lower surface of the first tilting link,
    wherein the stopper protrusion is operable to be in contact with the elastic member.

11. The serving robot apparatus of claim 8, further comprising:
    a processor configured to control the tilting motor so that a preload is applied to the first tilting link based on a movement of the main body by the first driving device.

12. The serving robot apparatus of claim 1, wherein the main body comprises:
    a first sidewall and a second sidewall disposed to face each other and supporting the shelf horizontally;
    a first body supporting an upper end of the first sidewall and an upper end of the second sidewall; and
    a second body supporting a lower end of the first sidewall and a lower end of the second sidewall.

13. The serving robot apparatus of claim 12, wherein a rear surface of the display is disposed to face a side surface of the first body.

14. The serving robot apparatus of claim 1, further comprising:
    a cable member disposed along the link member and electrically connected to the display.

15. The serving robot apparatus of claim 1, further comprising:
    a processor configured to, based on receiving a serving command comprising a serving position, control the first driving device so that the main body moves within a preset distance range from the serving position, and control the second driving device so that a front surface of the display faces the serving position.

16. A robot for transporting an object, the robot comprising:
    a display comprising a front surface and a rear surface;
    a main body;
    a horizontal shelf operable to support the object to be transported;
    a variable-length linkage arm connected a motor in the main body;
    a mount disposed at a distal end of the variable-length linkage arm and pivotably coupled to the rear surface of the display;

a guide rail configured to slidably support the mount; and
a processor configured to:
: based on receiving an instruction, control the robot to move to a predetermined position, and control the motor connected to the variable-length linkage arm, to move the display about the main body so that the front surface of the display faces a predetermined direction at the predetermined position.

17. The robot of claim 16, wherein the variable-length linkage arm comprises a slotted link and a distal link, one end of the slotted link coupled to the motor in the main body and one end of the distal link slidably coupled to the slotted link, and another end of the distal link coupled to the mount.

18. The robot of claim 17, wherein the display is tilted toward the predetermined direction based on an input signal.

19. The robot of claim 18, wherein the input signal is based on a pose of a person, a gaze of a person, or a location of a physical attribute of a person.

20. The robot of claim 19, wherein the pose of the person, the gaze of a person, or the location of the physical attribute of the person is determined from an image of the person captured by a sensor.

\* \* \* \* \*